United States Patent

Strebig

[15] 3,691,668
[45] Sept. 19, 1972

[54] AUTOMATIC ELECTRIC JIG-FISHING DEVICE

[72] Inventor: Richard W. Strebig, 2524 Priscilla Lane, Fort Wayne, Ind. 46806

[22] Filed: April 30, 1971

[21] Appl. No.: 138,926

[52] U.S. Cl. .................................................43/19.2
[51] Int. Cl. .............................................A01k 97/12
[58] Field of Search..........................43/19.2, 15, 16

[56] References Cited

UNITED STATES PATENTS

| | | | |
|---|---|---|---|
| 2,746,198 | 5/1956 | Smith | 43/19.2 |
| 2,783,574 | 3/1957 | Bayes | 43/16 |
| 2,795,072 | 6/1957 | Porter | 43/16 |
| 3,550,302 | 12/1970 | Creviston et al. | 43/19.2 |

*Primary Examiner*—Warner H. Camp
*Attorney*—Edmund W. Kamm

[57] ABSTRACT

A fishing lure jigging apparatus having a case, a shaft rotatably mounted in the case and a relatively short, stiff fishing rod mounted, by means of a quickly separably coupling, on the shaft so as to extend radially therefrom. A relatively powerful solenoid is mounted on the case with its armature plunger extending transversly of and adjacent to said shaft. A lever connecting said armature so as to oscillate the shaft as the armature reciprocates, this arrangement being such that energization of the solenoid moves the armature and shaft so as to raise the tip of the pole. A spring acts to eject the armature from the coil and to move the outer end of the armature into contact with an adjustable stop which thus determines the effective length of the solenoid stroke as well as the lowermost position of the rod tip. A rechargeable lead-acid storage battery is mounted in the case and supplies power to the solenoid through an electronic pulsing circuit which is adjustable to vary the pulsing rate throughout a relatively wide range. Signal means are connected with said circuit to produce a signal for each pulse, said signals being intermittent so long as the solenoid continues to cycle but become continuous when such cycling is interrupted as by a strike or by fouling of the lure. Electrical connector sockets are mounted on the case and are connected to the battery to supply charging current thereto. These sockets also accept the plugs of a flourescent lamp circuit. Mounting means are provided on the case for removably receiving interfitting means on the base of the staff of the lamp which is thereby positioned so as to illuminate the fishing area. Means are also provided for holding the case in place on the seat of a boat or other suitable support. By varying both the length of travel of the pole tip and the time between the power strokes thereof, a large number of different cycle patterns are available to permit the selection of the pattern which produces the most effective action of the particular lure which is being used.

23 Claims, 12 Drawing Figures

INVENTOR
RICHARD W. STREBIG

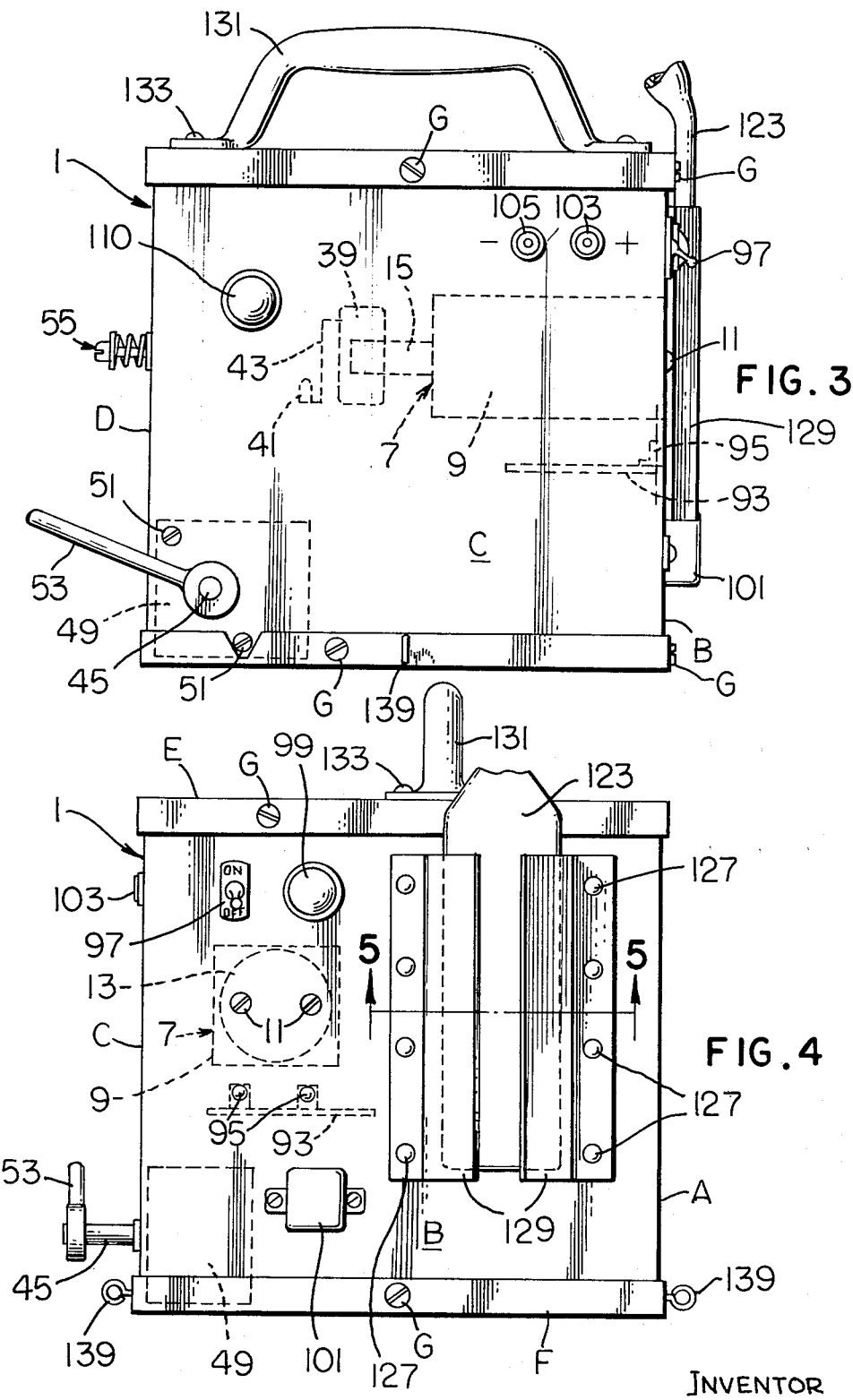

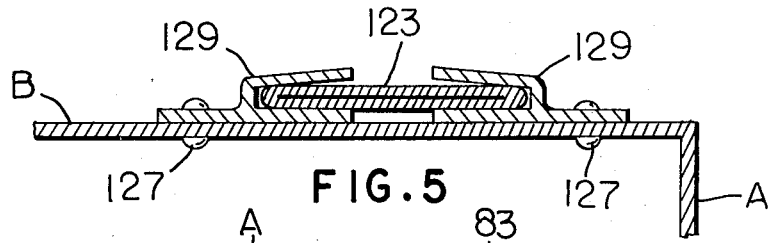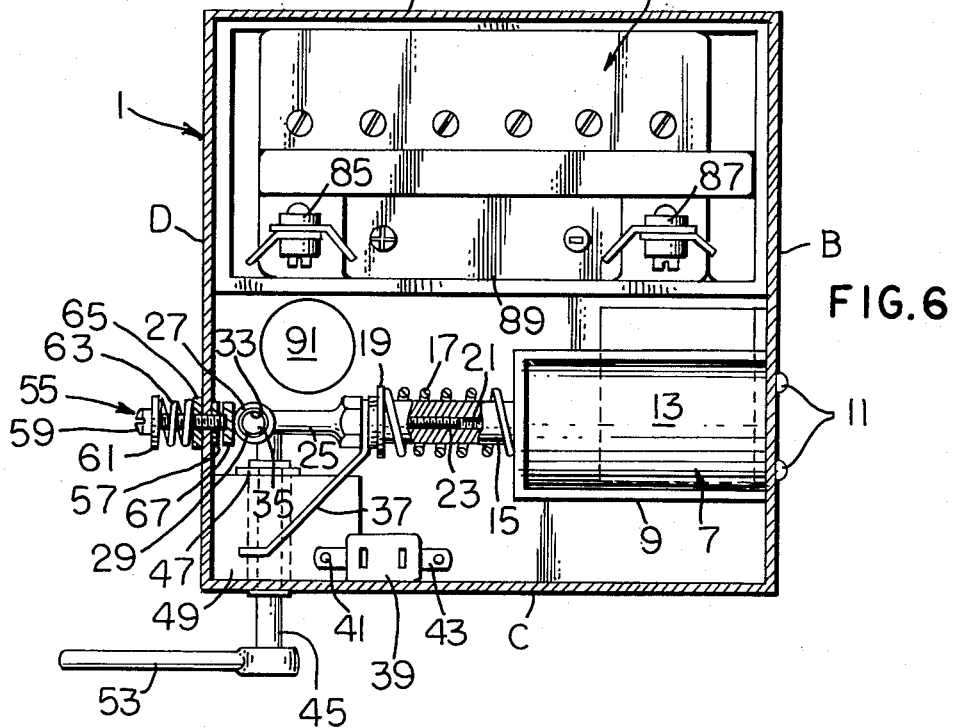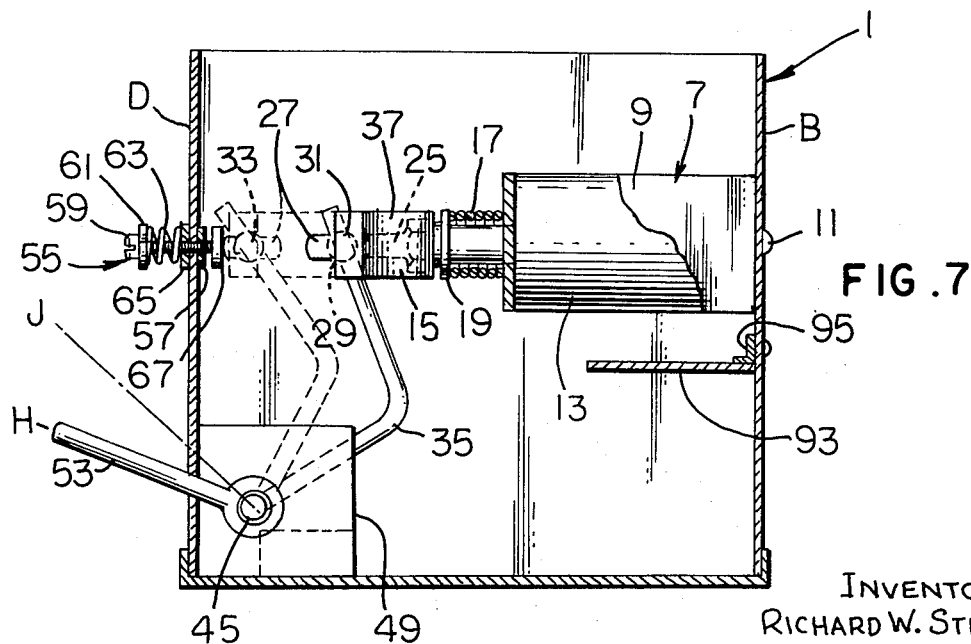

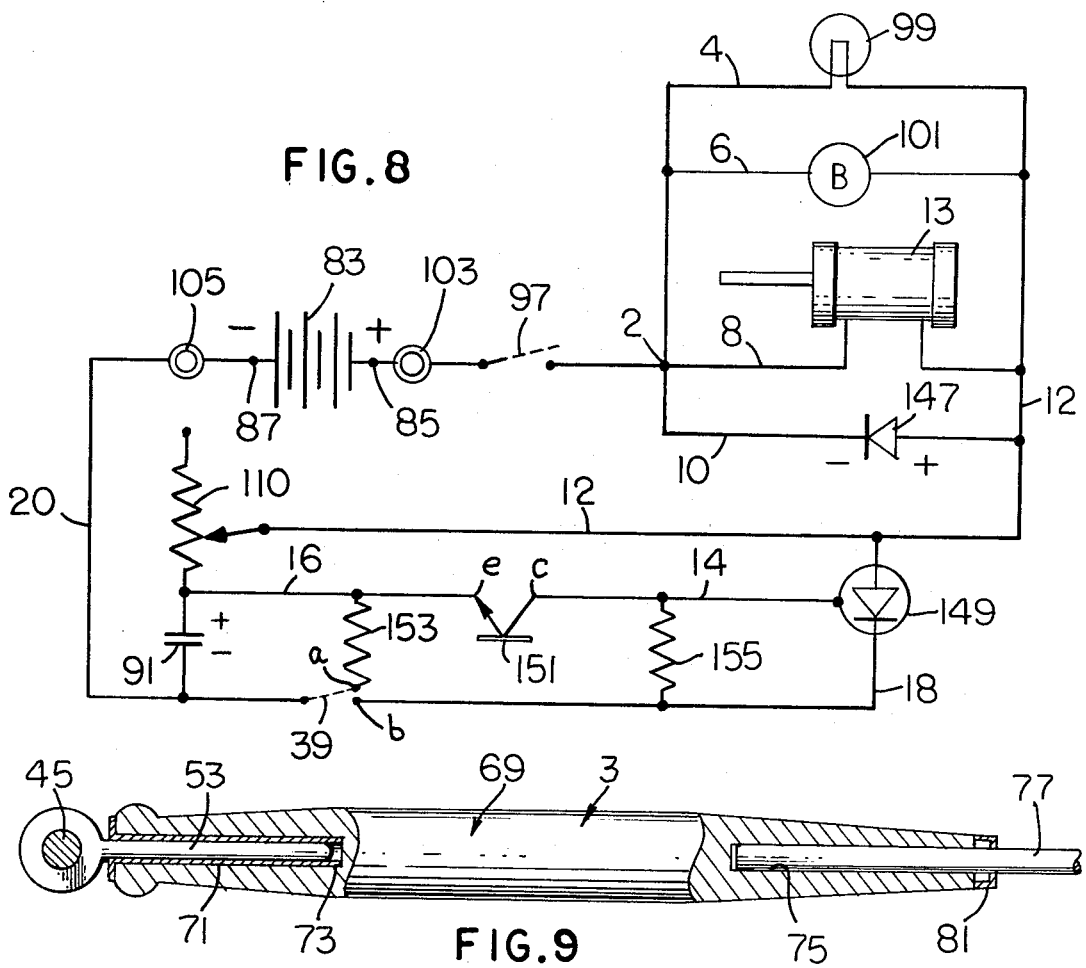
FIG. 8
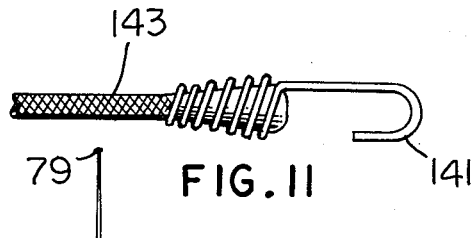
FIG. 9
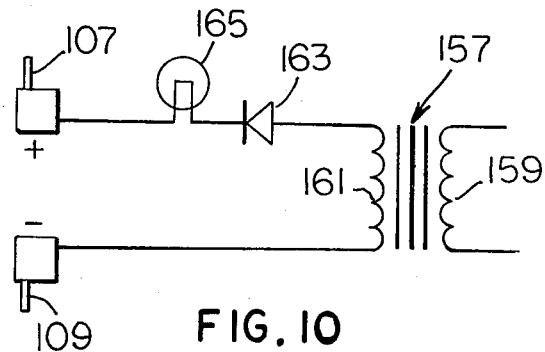
FIG. 11
FIG. 10
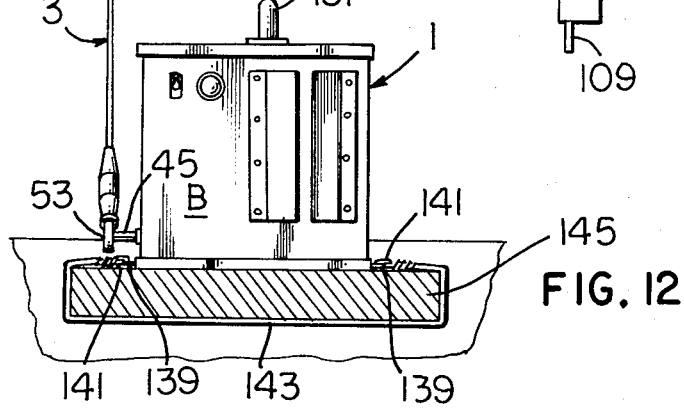
FIG. 12
INVENTOR
RICHARD W. STREBIG
by
Attorney

AUTOMATIC ELECTRIC JIG-FISHING DEVICE

BACKGROUND OF THE INVENTION

1. Field of Invention

The invention relates to the art of "jigging", a form of fishing in which a lure is jerked from a maximum depth, which is usually determined by the length of line depending from a fishpole, to a lesser depth. The line is then slackened and and lure is allowed to gravitate toward its initial depth. This action is performed repeatedly and substantially continually until a strike occurs. It may be performed manually, but since the operation is tiresome, various forms of automatic jigging devices have appeared in the prior art.

2. Description of Prior Art

The prior art discloses various types of mechanisms for generating oscillations and for transmitting them to the lure. One form which appears therein is a vibrator mechanism similar to a door bell system, in which the oscillations of the clapper are transmitted to a linkage which in turn transmits them to the fishing line. A number of rotary motor units are also found. The motors are powered variously, by electricity, springs and even wind and waves, to generate oscillations. The rotary motion is converted into oscillating or reciprocating movements which are transmitted to the lure.

The means for transmitting the oscillations to the lure varies widely. In some cases the generator, power supply and transmission means are mounted directly on a casting rod of the usual length. In other cases, the generator is a separate unit which has a cradle in which the pole rests, for transmitting the motion. Again, the pole may e separately mounted on a stand and the generator is connected with the stand or the pole so as to impart the oscillations. In still other cases the oscillations are transmitted directly from the generator to the fishline through friction clamps which engage the line.

Insofar as applicant has been able to determine, the prior art appears to be concerned primarily with specific mechanisms for producing oscillations which have a fixed pattern for each device, although as between the various devices, this pattern may vary from mere vibration to a jerk case, (FIG. slack type of cycle, or even a slow, "rocking" cycle. It also appears to be concerned with various specific means for transmitting the generated oscillations to the line. No consideration appears to have been devoted to an apparatus which is capable of providing a large number of jigging cycle patterns from which may be chosen the pattern which will cause the particular lure to perform its intended "actions" and functions properly and effectively. Also, little attention appears to have been devoted to insuring the faithful transmission of the selected cycle pattern to the lure, or to providing sufficient power to the cycle generator to enable it to handle heavy or motion resisting lures, along with the various weights or sinkers which may be used with such lures.

SUMMARY OF THE INVENTION

It is common practice to hook various natural lures in certain ways so that they will perform certain movements or have an "action" as they are drawn through or settle in the water. Numerous artificial lures are shaped or provided with devices such as fins, swivels, spades etc., which will cause the lure to dart, wobble, dive, spin, make noise etc., as it moves through the water. Such actions are believed to attract fish and thus render the lure more effective. However, unless the lure is operated in a prescribed manner, which is usually peculiar to the specific lure, the action sought will either not occur or may not develop fully.

In jigging, the lure is accelerated upwardly by means of a jerk, the line is then slackened and the lure gravitates toward its initial depth.

Since the lure is operated in water, which is a relatively dense medium, various factors such as the configuration of the lure, the disposition of its surfaces and those of the appurtenant devices, relative to the direction of the jerk, the weight and size of the lure and its sinkers, if these are used, determine the amount of resistance with which the lure opposes acceleration. It follows that if the stroke generator is underpowered, it cannot properly accelerate high resistance lures. The same result occurs if the stroke transmitting means includes highly flexible or otherwise yieldable elements such as a flexible pole, frictional line clamps or excessive lost motion. The prior art devices disclose a failure to recognize such deficiencies.

It is apparent that the time required for the lure to return to its initial depth will be materially greater than that needed to move it the same distance on the power stroke, since the acceleration imparted to the lure by gravity is substantially less than that imparted by the stroke generator. To indicate the effects which the various forces acting on the lures have on the paths followed by them, the rise and fall phases of the lure cycle will be examined separately.

Obviously, all of the lures will have attained the same velocity at the point in the power stroke at which the acceleration drops to zero, since they are all accelerated to the same degree while being moved through the same distance, during the power stroke. At this point, all of the lures will possess a kinetic energy which urges them to continue to move in the same direction until the energy is dissipated. All of the lures will therefore rise to levels which are higher than that at which the acceleration became zero. However, since the amount of kinetic energy in each lure depends upon the mass of the particular lure, the lure having the greatest mass has the potential to rise to the greatest height above the lowest level, and vice versa. The heights to which the individual lures actually rise may not be in direct proportion to the kinetic energy possessed by them because during the rise from the zero acceleration level to the top level, various forces act on them to reduce the energy content to zero and when this occurs, the lure stops and begins the gravitational phase of its cycle.

The main forces which dissipate the energy of the lure are:

1. The force of gravity. Since this force is practically the same for all of the lures, all would be equally affected by it;

2. The force of buoyancy. In water, the value of this force would vary in accordance with the specific gravity of the particular lure and would dissipate the kinetic energy thereof at a rate which is peculiar to that lure and;

3. The resistance of the lure to its passage through water. This factor would vary according to the peculiar characteristics of the individual lures. Since on the up phase of the lure these forces act together, it follows that each lure is likely to have its energy dissipated at a different rate and will reach a different level at a different time compared to any other lure, and will begin its descent at that point.

The same forces act upon all of the lures during their descent, but in this case the gravitational forces act to accelerate the lures while the other two oppose such acceleration. The gravitational force is constant while the others vary according to the characteristics of the individual lure, so that the time required for any lure to complete its descent will likely be different from that of any other lure. Accordingly, a lure which quickly starts and develops its action, need not be projected to the maximum level by using the maximum power stroke. On the other hand, a lure which moves rapidly through its return path may be operated at maximum stroke so as to maximize the time during which it is presented for a strike. Since the peculiarities of the particular lure being fished indicated the length of the stroke which should be used for operating it and since this value may have to be established by observation, it is highly desireable to provide a relatively wide range of stroke lengths from which to select the length which will enable the lure to operate most effectively.

It is obvious that the subsequent power stroke should not occur before the lure has returned to the initial level from its previous cycle, since this would not only decrease the time during which it is presented for a strike but would also tend to reduce the effectiveness of the subsequent power stroke. Again, in view of the wide variation in the time required for different lures to rise to the top of the selected path and to return to the initial level, it is highly desireable to provide a wide range of time intervals between successive power strokes, so that the particular interval which permits the lure which is being fished to complete its cycle may be selected.

In view of the above discussion it is plain that some of the major objects of the invention are:

To provide a stroke generator which has adequate power available to operate a wide variety of lures having a wide variety of peculiar characteristics, to provide a stroke transmission means which will faithfully transmit the stroke of the power generator to the lure being fished and to provide means for varying the length of the power stroke and the length of the interval between power strokes, over relatively wide ranges, so the particular stroke length and interval which results in the most effective operation of selected one of the lures can be applied to such lure.

Another object is to provide a simple, sturdy stroke generator and transmission mechanism.

A further object is to provide a source of power which is capable of supplying to the stroke generator a high amperage current.

Another object is to provide electronic circuitry which will supply said current substantially instantaneously to said generator.

Still another object is to provide means for causing a rapid decay of the power pulse to cause the generator to return to its initial condition quickly.

A further object is to provide a motion transmission system which comprises substantially inflexible components and which minimizes lost motion.

Yet another object is to provide a system which imparts the power stroke positively to the lure.

Another object is to provide means for selectively adjusting the length of the power stroke throughout a relatively wide range of stroke lengths.

A further object is to provide means for selectively adjusting the time interval between power strokes throughout a very wide range of interval lengths.

Another object is to provide means responsive to the completion of the power stroke for quickly terminating the input of power to the stroke generator.

Yet another object is to provide means responsive to the flow of stroke generator actuating current for generating a signal.

A further object is to provide means for de-energizing said signal and said stroke generator substantially simultaneously.

Yet another object is to provide a portable electric power source capable of supplying a high current strength to said generator.

Still another object is to provide means for recharging said source.

It is a further object to provide a portable jigging apparatus having a case and having means for removably attaching a lamp to said case in a position so as to illuminate the fishing area.

A further object of the invention is to provide means for quickly installing and removing a fishing pole as an integral part of the stroke transmitting mechanism.

Another object is to provide a motion transmitting mechanism which comprises a minimum number of components.

Yet another object is to provide means for connecting said lamp to be energized by said power source.

A further object is to provide means for attaching the jigging apparatus to a support so as to retain it in a desired position during operation.

These and other objects will become apparent from a study of the following specification and the drawings which form a part thereof and in which:

FIG. 3 is a side elevation showing the fish pole mount, speed control and in dashed lines, some of the stroke generator mechanism.

FIG. 4 is a rear elevation showing the signal means and the lamp staff mounting means.

FIG. 5 is a section taken on line 5—5 of FIG. 4 showing the mounting means.

FIG. 6 is a plan view of the apparatus with the cover removed, showing the battery, stroke generator and other details.

FIG. 7 is a vertical elevation, with parts in section, showing the stroke generator and stroke adjusting means.

FIG. 8 is a diagram of the pulse generating circuitry and other elements.

FIG. 9 is an elevation, partly in section, of the fishing pole structure.

FIG. 10 is a diagram of the battery circuit.

FIG. 11 is an elevation of the hook end of the stretch rope.

FIG. 12 is an elevation showing the rope applied to hold the apparatus on the seat of a boat.

Figure 1:
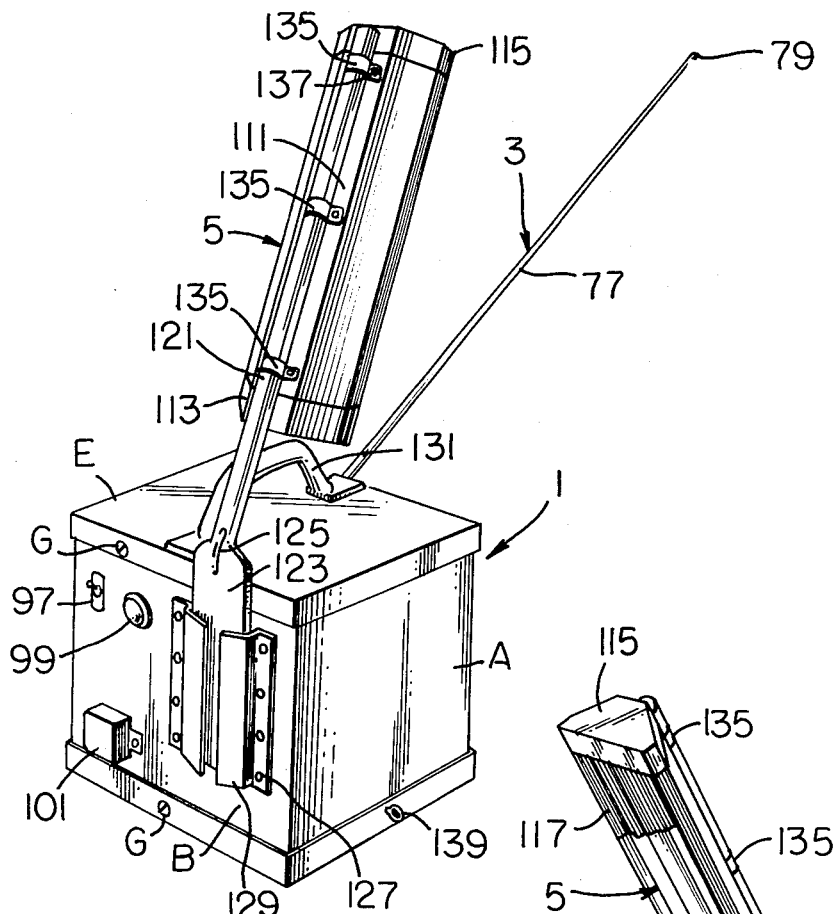
FIG. 1 is a perspective view from the rear and one side of the apparatus.
Figure 2:
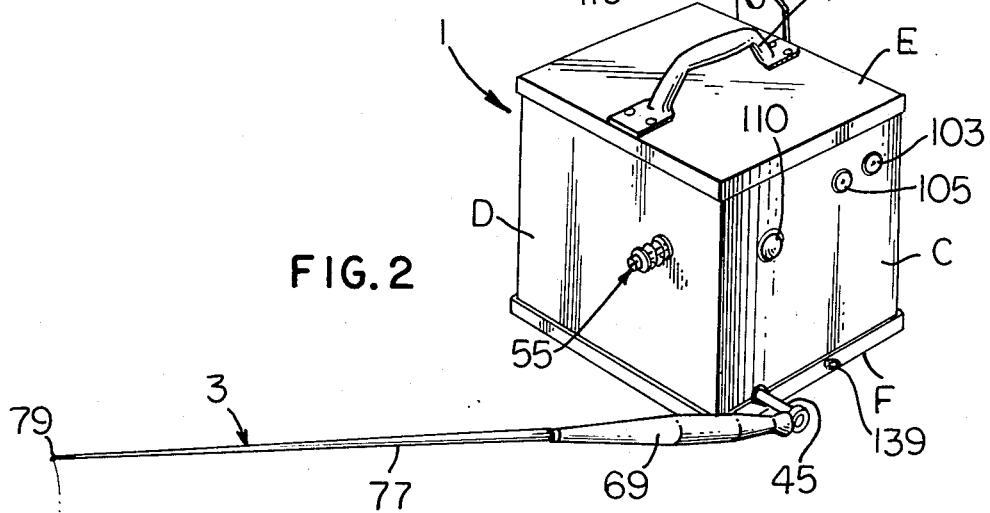
FIG. 2 is a similar view from the front and other side of the apparatus.

Referring to FIGS. 1 and 2, the jigging mechanism proper is indicated by numeral 1, to which is attached a fishpole 3 and a flourescent lamp 5. The mechanism is housed in a substantially cubic metal box which comprises four side walls A,B,C, And D and top and bottom covers E and F which have peripheral flanges to telescopically receive the respective open ends of the part formed by the walls. (FIGS. 3,4,6, and 7). Screws G pass through the flanges and walls to hold the parts assembled.

A solenoid 7 is fixed to wall B, with its central axis perpendicular to the wall, by means of a yoke or bracket 9 and screws 11. The solenoid coil 13, is fixed within the bracket and the armature 15 passes through the bracket and axially into the coil, for reciprocation therein. A compression spring 17 bears at one end on the bracket and at the other on a seat 19 on the armature so as to urge the latter out of the coil.

The left end of the armature is formed with an axial tapped hole 21 which receives a threaded stud 23 which projects axially from the journal piece 25 (FIG. 6), the end of which, opposite the stud, is provided with flattened, cylindrical eye 27. A journal ring 29, which is fitted with a ball bearing 31, is mounted in the eye. The ball defines a diametrical opening 33 which receives the upper end of the bent output lever 35.

The piece 25 is of larger diameter than the stud to thereby form a shoulder, so that when the stud is passed through a hole in the switch actuating cam 37, and the spring seat and is screwed into the armature, the parts will constitute a unitary element which reciprocates as the coil is energized and de-energized.

As seen in FIGS. 3 and 6, a switch 39 is mounted on wall C and has a roller 41 mounted on the switch actuating lever 43, so as to lie in the path of the cam 37, so that the switch will be actuated as the armature is drawn into the coil.

Further as seen in FIGS. 3,4,6, and 7, the lower end of lever 35 is fixed to a shaft 45 which is rotatably Mounted in a bearing 47 supported in a block 49 which is mounted on wall C by screws 51. Shaft 45 extends through wall C and has an arm 53 fixed to it in spaced relation with respect to wall C. Thus as the armature 15 reciprocates, the arm 53 also reciprocates in a plane which is parallel to, but spaced from that of the wall C. The free end of arm 53 therefore described an arc between the positions H and J (FIG. 7). The length of this arc can be varied at will by the stroke adjusting means indicated generally by 55.

This adjusting means is mounted on wall D and is best shown in FIGS. 6 and 7, in which a tapped nut 57 is fixed to the wall coaxially with a perforation formed in the wall, and a screw 59 is passed through spring seat 61, compression spring 63, seat 65, the perforation, and the nut. The screw carried a bumper 67, which preferably includes a rubber facing or other impact absorbing material, and which is positioned in the path of the eye 27, which comes to rest on the bumper when the solenoid is de-energized, due to the action of spring 17. The normal or starting position H of arm 53 is thus adjustable relative to the actuated position J by moving the screw 59 and bumper 67 toward or away from the solenoid, the former serving to decrease the arc H-J and the latter to increase it.

As shown in FIG. 9, the fishpole preferably comprises a wooden handle 69 having an axial bore 71 at its lower end in which a metal bushing or ferrule 73 is pressed. The ferrule is sized so that it will readily slip onto the arm 53 but with a minimum of clearance. The opposite end of the handle is also axially drilled at 75 to receive the butt end of a tip 77 which is preferably of fiber glass and is fitted with a metal tip or loop 79 to which the fishline is attached. The tip may be cemented in the handle and a ring ferrule 81 may be fixed to the handle, around the tip.

As shown in FIG. 6, a wet cell storage battery 83 occupies the portion of the box adjacent wall A whereas the solenoid and other parts described are disposed between the battery and wall C. This battery may be either a 6 or 12 volt unit depending upon the weights of the lures to be used. Thus for ordinary fishing, the 6 volt unit would suffice whereas for game fish, larger and heavier lures and tackle would be required and the 12 volt battery and correspondingly designed circuitry would be preferable. The plus and minus terminals of the battery are indicated at 85 and 87. The battery is preferably set in a container 89, which may be of any corrosion resistant material which will prevent any liquid which might be spilled from the battery during handling of the apparatus from reaching the mechanism or the electrical components of the circuitry.

Also shown in FIG. 6 is an electrolytic condenser 91 and in FIG. 7 is shown a circuit board 93 which is mounted, by suitable brackets 95, on wall B, underneath the solenoid. An "on-off" switch 97 is mounted on wall B of the A 4), and is connected to supply current from the positive pole of the battery to the circuit. A signal lamp 99 is also shown on wall B which indicates that the lure is being held; such as by the stroke of a fish. A buzzer 101 or other audible signal device may be used instead of, or in addition to the lamp, if desired.

Two sockets 103, 105 are mounted on wall C and are connected to the battery terminals 85, 87 respectively, (FIG. 3). They are adapted to receive plug connectors such as 107, 109 of FIG. 10 for charging the battery or similar connectors of the lamp 5. A potentiometer 110 is mounted on wall C.

The fluorescent lamp 5 comprises lamp tubes 114 which operate on the battery voltage, which are supported in the usual manner on a board 111 and are housed by the end caps 113, 115 and the translucent cover 117. An "on-off" switch 119 is provided to control the lamp. A mast 121 made from hollow round tubing, preferably of metal, such as aluminum, has its lower end flattened to provide a spade portion 123. The space may be bent relative to the tubular portion at 125 to the degree needed to enable the lamp to illuminate the fishing area, and so as to be balanced above the case to prevent tipping of case.

Mounted on the wall B (FIGS. 3, 4, and 5) by fasteners such as rivets 127, are two Y-shaped rails 129 placed so that the bifurcations thereof face each other (FIG.5), so as to receive the spade 123 snugly therebetween. The rails are disposed parallel to wall A and in the region adjacent the end of the battery. Accordingly, since the greatest weight comprises that of the lamp and battery, the carrying handle 131 is fastened to the cover E by fasteners 133, parrallel to wall A and materially to the right of the central portion of the cover, as in FIG. 4, so that the unit will not tend to tilt when it is lifted. The lamp board 111 is mounted on the mast by means of C-clamps 135 which are fastened to the board by screws 137.

Eye bolts 139 are fixed in the flanges of the bottom cover F and the bottom ends of walls A and C, midway of their width, FIGS. 3, 4, and 12, to receive the hooks 141 which are fastened to the ends of a stretchable rope 143 (FIG. 11). Thus by engaging one hook with its eye and passing the other end under a platform, such as the seat of a boat 145, and engaging the other hook with the remaining eye, the apparatus can be held in position on the platform instead of being dislodged due to the motions of the boat, vibrations etc.

THE CIRCUITRY

As shown in FIG. 8, switch 97 is connected directly to the plus terminal 85 of the battery. The other side of the switch is connected at 2 to supply four parallel circuits represented by line 4, through the lamp 99; line 6, through the buzzer if it is used; line 8 through the coil 13 of the solenoid and line 10 to a rectifier 147. The opposite sides of these elements are connected to a common lead 12 which runs to the movable contact of the potentiometer 110. The rectifier blocks the flow of current from the switch to line 12 through circuit 10. The anode of a silicon controlled rectifier (SCR) 149 is connected to line 12.

The gate of the SCR is connected by lead 14 to the collector of an NPN transistor 151 while the emitter thereof is connected by line 16 to the potentiometer. The base connection of the transistor is not used.

The cathode of the SCR is connected through line 18, through the normally closed contacts b, of switch 39 and line 20 to negative terminal 87 of the battery 83.

The electrolytic condenser 91 has its plus side connected to line 16 at the potentiometer and its negative side connected to line 20. A LOOK resistor 153 is connected from line 16 to the contact a), of switch 39. A 10K resistor 155 is connected from line 14 to line 18 which runs to the b contact of the switch.

For the 12 volt system described above, I have successfully used a G.E. A14F rectifier 147; a 3.5 amp SCR 149-International SCR-02-C; Transistor 151-G.E. 20; Capacitor 91 250 MFD 10v; a 10 K potentiometer 110 and the 100K and 10K resistors. Switch 39 is normally closed on its b contact but is shifted to close its a contact when the solenoid has pulled the armature substantially into its coil.

CIRCUIT OPERATION

Whenever the switch 97 is closed manually, the positive battery voltage will be applied through the solenoid to the anode of the SCR and to the capacitor 91 through the potentiometer. Since the SCR gate is open, no current will pass through the SCR and consequently there is no large current flow through the solenoid. The flow through the solenoid, lamp 99 and buzzer 101 is limited to that which is flowing through the potentiometer to the capacitor and this current is not sufficient to cause actuation of these elements. The rate at which the capacitor charges is established by the setting on the potentiometer. The greater the resistance set on the potentiometer the slower the rate of charge. With switch 39 closed on its b contacts, resistor 155 and the SCR cathode are both grounded to negative battery.

As the voltage builds up on the capacitor, it will likewise build up on the emitter of the transistor 151 and upon reaching the threshold value thereof, current will flow through 16, 151, and 14 to the SCR gate, which is therefore made more positive than the SCR cathode, due to the resistor 155. Since both the anode and the gate are positive with respect to the cathode, the SCR will fire and carry a large current. Since this current is supplied from the plus terminal of the battery, through the solenoid coil, the signal lamp and the buzzer, all three elements are fully energized to perform their individual functions.

When the armature of the solenoid is drawn into the coil, the switch 39 opens its b and closes its a contacts. This grounds the capacitor 91, emitter and potentiometer to negative battery through resistor 153 to reduce the voltage in this system. It also breaks the cathode circuit 18 to interrupt the current flowing through the SCR. The gate and cathode voltages equalize through resistor 155 so that the SCR is opened. The current through the solenoid, lamp and buzzer drops so that these elements are restored to their initial conditions and as the armature is returned to its initial condition, the a and b contacts of 39 are also opened and reclosed, respectively, so that the succeeding cycle will start.

Since the collapse of the field of the solenoid could produce some undesireable effects, and since the voltage produced by such collapse is applied in a direction which is opposite to the battery voltage, the rectifier 147 acts to allow the induced current to circulate through the coil thereby disposing of the unwanted potential.

As noted above, during operation of the apparatus at night, the leads from the lamp 5 (not shown) are fitted with plugs similar to 107, 109, shown in FIG. 10, which may be inserted in the sockets 103, 105 which are connected to the battery terminals ahead of switch 97. Thus light will be available to the user whether or not the apparatus is operating. The lamp circuit is responsive solely to switch 119 located on the lamp.

BATTERY CHARGING

In order to recharge the storage battery when it is not in use, any type of charging device of the proper voltage may be used. One form of such charger is shown in FIG. 10 and comprises an input winding 159 for the high voltage A.C. supply and the output, low voltage winding 161. A rectifier 163 and a lamp 165 are connected in series between the positive plug 107 and one end of the coil 161 while the negative plug 109 is connected directly to the other end of coil 161. This rectifier may be mounted within the case, along with the transformer, if desired. In such case, a standard 110 volt plug connector may be mounted on one of the walls for connection to a corresponding 110 volt receptacle.

SUMMARY OF OPERATION

While the various factors which must be considered to secure the proper action of the bait or lure being jigged have been fully discussed above, it is believed that a short summary of the operation of the apparatus will be helpful.

To prepare the apparatus for operation, it is deposited on a suitable support, such as the deck of a raft, the seat of a boat or on the ice of a frozen lake or stream. In instances where the device is used other than on a frozen lake or stream, the device is fastened down by engaging one hook 141 with an eye 139, looping the rope around or under some available fixed member, stretching the rope and engaging the remaining hook and eye. The ferrule of the fishing pole is telescopically engaged with the free end of arm 53 and the desired lure is attached to the free end of the line. The line and lure are then thrown into the water and switch 97 is closed to start the jigging operation.

Closure of switch 97 causes the cycle control means to operate. The capacitor 91 begins to accumulate a charge and the transistor 151 discharges the capacitor to the gate of the switching means (SCR 149) when the threshold voltage of the transistor is reached. The switching means becomes conductive so that the solenoid coil and the signal devices 99 and 101 are energized. The coil moves the armature to its actuated position and raises the arm 53 and the rod tip to the J position, FIG. 7, jerking the line and lure to the uppermost level.

In the 12 volt system described, the SCR is capable of passing a 3.5 ampere current. It has been found that a 2.5 ampere current is adequate to rapidly accelerate even the heaviest lures used for fresh water fishing.

As the armature reaches the actuated condition, switch 39 b opens and 39 a closes. The first event opens the circuit through the coil, signal devices and the switching means and restores the latter to its non-conducting condition. The latter event connects the capacitor to negative battery through resistor 153 so as to restore the cycle control means to the initial condition. Spring 17 now acts to move the armature and arm 53 to their initial positions (H) and this event also restores the switches 39 to their normal conditions, to start the subsequent cycle.

The operator can usually determine whether the bait is being operated properly by merely observing the line at the point where it enters the water. If the slack in the line disappears quickly, leaving a relatively long period of time until the next jigging stroke occurs, it is obvious that the bait has reached its lowest level too soon. This presents the the operator with the options of adjusting the screw 59 away from the end of the armature to thereby increase the magnitude of the stroke, of decreasing the resistance of the potentiometer 110 to increase the frequency of the cycles or both, in accordance with his judgement.

If slack remains in he line when the subsequent stroke occurs, the adjustments mentioned may be made in the opposite directions to overcome the condition.

An alternative method of determining the best settings of the adjustments involve pulling in line, through the loop 79 until the bait is near enough to the surface to be visible, holding the line and adjusting the stroke and/or the frequency until the bait performs as desired.

Since jigging is often pursued at night, the lamp staff is made so that it can be easily and quickly, yet firmly mounted in position to illuminate the fishing area and can be quickly connected with the battery by inserting the plugs in connectors 103, 105.

During the operation of the apparatus, the regulator, periodic occurrance of the signals signifies that the apparatus is operating properly. However, when the completion of the power stroke is prevented by the snagging of the bait or by a strike the current continues to flow through the coil 13 and the signal devices, because the switch 39 b does not open, and the SCR remains conductive. Thus when a continuing signal is given the operator can quickly and easily disconnect the rod from the arm 53 and deal with the existing condition manually, apart from the apparatus.

The battery may of course be charged at any convenient time. The rectifier shown in FIG. 10 may be a separate unit which is supplied form the usual house current by plugging the transformer primary into such a source and the plugs 107, 109 into the sockets 103, 105. On the other hand, the transformer and rectifier may be built into the jigging apparatus and in this case a plug portion of a suitable connector would be mounted on the case for connection with a house current supply cord having a mating receptacle at the end thereof, (not shown).

While the apparatus described and illustrated herein discloses the preferred form of my apparatus, it is obvious that various changes, additions and substitutions may be made therein without departing from the spirit of the invention. I do not desire therefore to be limited to the specific form disclosed, but desire protection for all forms thereof which fall fairly within the scope of the appended claims.

I claim:
1. A fishing bait jigging apparatus which comprises
   a. an arm, means mounting said arm for pivoting about an axis which extends transversely through the arm, means for connecting a fishing line, having an attached bait with said arm so as to be rapidly displaced when said arm is pivoted from an initial to an actuated position and so as to be slackened when the arm is returned to said initial position,
   b. a solenoid comprising an energizable coil and an armature mounted for movement from an initial to an actuated position when the coil is energized, means connecting said armature to move said arm to its actuated position when said armature moves to its actuated position,
   c. yieldable means disposed so as to restore said armature and arm to their initial positions when said coil is deenergized,
   d. means for energizing said coil, comprising a switching device having a normal, non-conducting condition and a conductive condition, a battery means for connecting said coil and said device with said battery so as to energize the coil when the device is conductive,
   e. cycle control means having normal and second conditions and comprising means, connected with said battery and operable in response to battery current over a period of time, for establishing the control means in its second condition, said switching device including means responsive to said control means in its second condition, for establishing the device in its conductive condition to energize said coil.

2. The apparatus defined by claim 1 in which said cycle control means, in its normal condition, includes means for accumulating a charge from said battery, means responsive to the accumulation of a predetermined charge, for establishing the means in ots second condition, in which said accumulating means discharges into the responsive means of said switching device to render said device conductive.

3. The apparatus defined by claim 2 in which the switching device comprises a silicon controlled rectifier having an anode, a cathode and a gate and in which said connecting means connects said anode, cathode and the battery in series with the coil, said cycle control means including means for discharging said accumulated charge to said gate to render said rectifier conductive.

4. The apparatus defined by claim 3 in which the cycle control means includes a transistor, means connecting the emitter thereof with said accumulating means and the collector thereof with said gate, said transistor being constructed so as to become conductive in response to the accumulation of a predetermined charge by said accumulating means, so as to discharge said charge to said gate.

5. The apparatus defined by claim 2 wherein said charge accumulating means includes a capacitor and means connecting said capacitor across the battery, and wherein said means for establishing said second condition comprises normally nonconductive switching means connected between said capacitor and the responsive means of said device, said switching means being constructed so as to become conductive upon the accumulation of a predetermined charge by said capacitor, so as to discharge said capacitor to said responsive means.

6. The apparatus defined by claim 5 which includes means responsive to the operation of said armature for restoring said switching device and switching means to their normal conditions and which includes a potentiometer connected so as to control the rate of charging of said capacitor, said potentiometer including means for setting the resistance thereof to any of a number of values within a predetermined range of values, so as to alter the frequency of the displacements of said fishing line and said bait.

7. The apparatus defined by claim 1 which includes means for adjusting the rate of charging of the cycle control means so as to vary the time required to establish said cycle control means in its second condition.

8. The apparatus defined by claim 7 which includes means for adjusting the magnitude of the displacement imparted to the fishing line, so as to alter the path traversed by the bait during the jigging cycle.

9. The apparatus defined by claim 1 which includes means responsive to the energization of said coil for restoring said switching device and cycle control means to their normal conditions.

10. The apparatus defined by claim 1 which includes a normally closed first switch and a normally open second switch, said fist switch forming a part of said means for connecting said coil and said device with said battery, said second switch serving to connect said cycle control means to negative battery, means operable by said armature, when it is moved toward its actuated position, for opening said first switch and closing said second switch to respectively deenergize said coil and to normalize said cycle control means and said switching device.

11. The apparatus defined by claim 1 which includes means for adjusting the magnitude of the displacement imparted to the fishing line so as to alter the path traversed by the bait during the jigging cycle.

12. The apparatus defined by claim 11 wherein said magnitude varying means includes adjustable stop means disposed so as to pre-establish at least one of said two positions of said armature and said arm.

13. The apparatus defined by claim 12 wherein said stop means is disposed in the path of said armature and is adjustable to any of a number of different positions which constitute a predetermined range of adjustments.

14. The apparatus defined by claim 1 which includes means for producing a signal upon energization, means connecting said signal producing means with said battery and said switching device so as to be energized substantially concurrently with said coil.

15. The apparatus defined by claim 14 which includes means for producing an audible signal.

16. The apparatus defined by claim 14 which includes means for producing a visible signal.

17. The apparatus defined by claim 1 wherein said means for connecting a fishing line with said arm comprises a fishing pole having a longitudinal axis, means fixed at one end of said pole for supporting the line so as to depend from said pole and means at the opposite end of the pole defining one portion of an axially separable connector, the free end of said arm including means defining a connector portion which is adapted to interfit with the first mentioned portion so that said pole may be readily mounted on and demounted from said arm by axial movement of said pole relative to said arm.

18. The apparatus defined by claim 1 which includes a case having side walls and a top cover, first connector means mounted on one of said walls and extending upwardly toward said cover, an elongated staff, second connector means mounted on one end of said staff, said connector means being constructed so as to interfit to form a joint for mounting said staff on said case with the staff extending above the cover thereof, an electric lamp, means for mounting the lamp on said staff for adjustment thereof so as to illuminate the fishing area, receptacle means, comprising prong receiving sockets, mounted on said case, means connecting said sockets with the battery to supply current to and from said battery, plug means, including prong elements adapted to fit said sockets, and conductors connecting said prong elements with said lamp to supply battery current thereto.

19. The apparatus defined by claim 18 wherein said staff mounting connector means are constructed so as to interfit snugly in response to axial alignment and relative axial movement toward each other.

20. The apparatus defined by claim 18 wherein said lamp comprises a fluorescent tube and means for starting and maintaining the operation of said tube in response to the application of current thereto from said battery.

21. The apparatus defined by claim 1 which includes a case comprising side walls having a bottom wall and a top cover attached thereto, said apparatus being normally supported against gravitation by contact between said bottom wall and a relatively fixed object, means for preventing substantial translation of said apparatus in directions substantially parallel to said bottom wall comprising an elongated, flexible normally contracted extensible member, a first connector element fixed to each end of said member, second connector elements mounted on said case at substantially opposed points with respect to the periphery of said bottom wall, said first and second elements comprising a pair and having interfitting means which are engageable to connect them together, so that with said pairs connected and with said flexible member held at least partially extended by a relatively fixed object disposed between and in contact with said member and said bottom wall, said member serves to oppose said translation.

22. The apparatus defined by claim 21 wherein said flexible member comprises a stretchable rope.

23. The apparatus defined by claim 1 which includes a. a case comprising side walls having a bottom wall and a cover attached thereto, means mounting a shaft therein for rotary reciprocation about an axis, one of said side walls defining an opening through which one end of the shaft projects, means for mounting said arm so as to extend substantially radially from the projecting end of the shaft, b. said armature movement being a reciprocation along an axis which extends transversely of the axis of said shaft, said axes being spaced so as not to intersect, c. said means for connecting said armature to move said arm including said shaft and a motion transforming mechanism, said mechanism comprising means connected to be driven by said armature for converting the reciprocation thereof into rotary reciprocation and means for transmitting said rotary reciprocation to said shaft.

* * * * *